T. B. WICKHAM.
Farm Gate.
No. 61,785.
Patented Feb. 5, 1867.
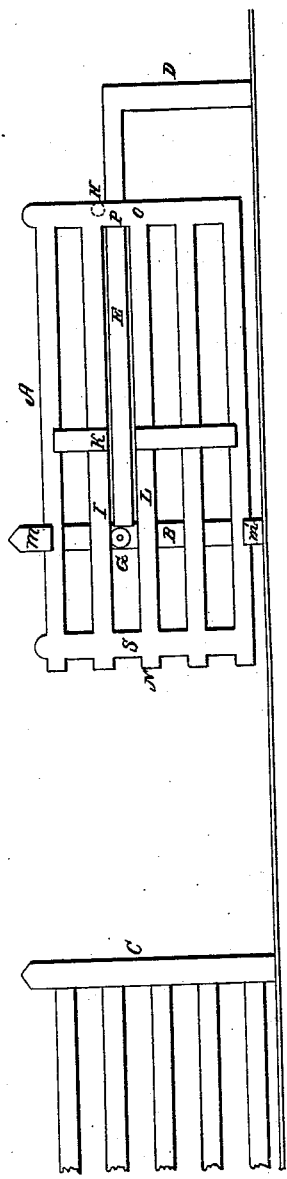
Witnesses:
James M. Goodwin
Thomas D. Mitchell
Inventor:
Thos B. Wickham

United States Patent Office.

THOMAS B. WICKHAM, OF GRANVILLE, OHIO.

*Letters Patent No. 61,785, dated February 5, 1867.*

---

IMPROVEMENT IN FARM GATES.

---

*The Schedule referred to in these Letters Patent and making part of the same.*

---

TO ALL WHOM IT MAY CONCERN:

Be it known that I, THOMAS B. WICKHAM, of Granville, in the county of Licking, in the State of Ohio, have invented a new and improved Farm Gate; and I do declare that the following is a full and exact description thereof, reference being had to the accompanying drawings, and to the letters of reference marked thereon.

The nature of my invention consists in the manner of construction and operating farm gates.

To enable others skilled in the art to make and use my invention, I will proceed to describe its construction and operation.

I construct my gate so as to move parallel with the fence. A exhibits the gate partly open. B exhibits the main post. C exhibits the post to shut against, and D another post which supports one end of the bar E extending to post B, and which supports the gate in its movements. G exhibits a roller fastened to post B, over which the bar I moves. H exhibits a roller in a mortise in stile O of the gate, and which rolls upon bar E as the gate is opened and closed. K exhibits how the central slat is cut away between the bars I and L to leave space for roller G. $m\ m'$ exhibit pieces of plank nailed to post B to form grooves for the gate to slide in and to support it in position. N exhibits the rails or bars of the gate projecting beyond the slide S for the purpose of shutting into post C. P exhibits a mortise in stile O, through which bar E passes.

What I claim as my invention, and desire to secure by Letters Patent, is—

1. Supporting the gate upon bar E and roller G, together with the movable roller H.

2. Cutting away or dividing slat K and leaving space at the top and bottom rails for passing through the grooves $m\ m'$.

3. Making a mortise in stile O, through which passes bar E, also joining grooves $m\ m'$ for supporting the gate in position, all as substantially described and for the purposes set forth.

THOMAS B. WICKHAM.

Witnesses:
    JAMES M. GOODWIN,
    THOS. D. MITCHELL.